March 1, 1927.
R. L. CAIRNCROSS
1,619,595
RAIL JOINT SPRING
Filed March 17, 1926
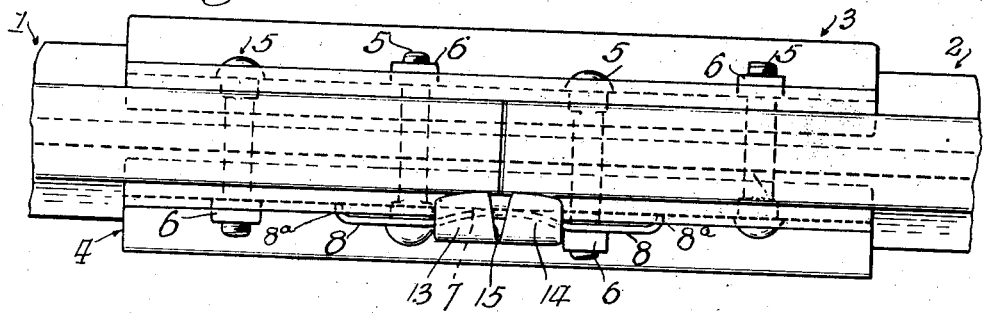
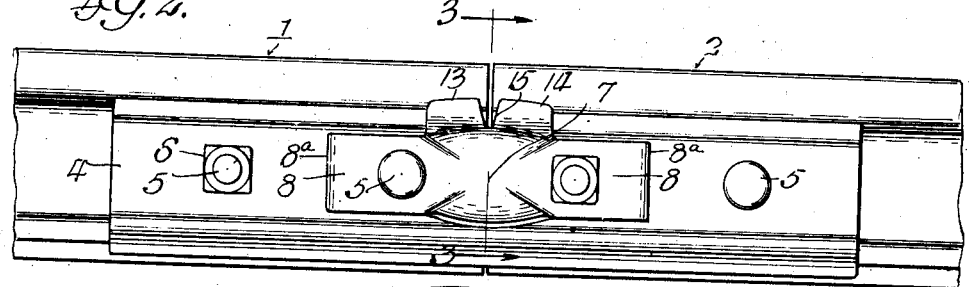
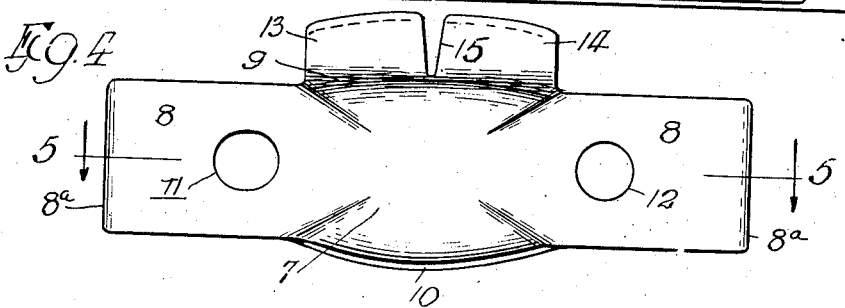
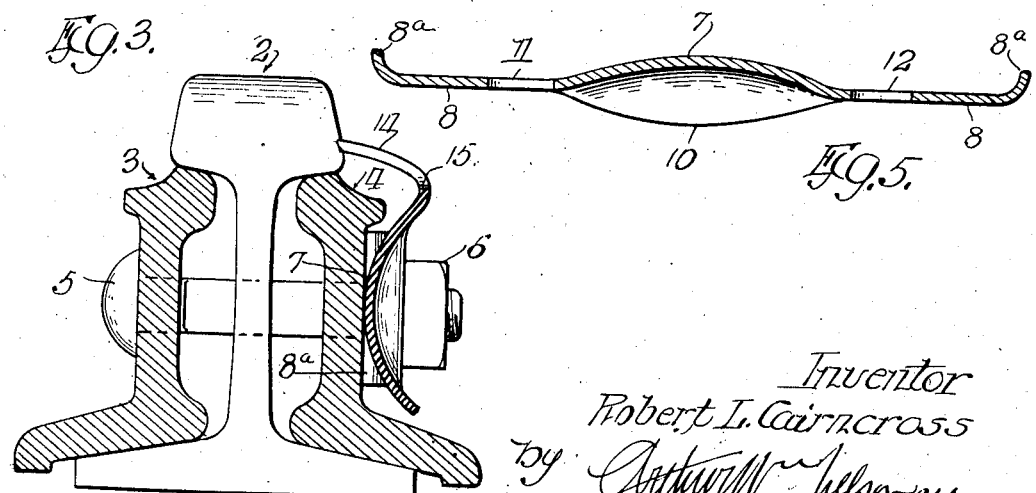
Inventor
Robert L. Cairncross Patented Mar. 1, 1927.

1,619,595

UNITED STATES PATENT OFFICE.

ROBERT L. CAIRNCROSS, OF CHICAGO, ILLINOIS.

RAIL-JOINT SPRING.

Application filed March 17, 1926. Serial No. 95,206.

This invention relates to improvements in rail joint springs and it consists of the matters hereinafter described and more particularly pointed out in the appended claims.

The primary object of the present invention is to provide an improved spring plate or strip to receive the ends of at least two splice bar bolts, so as to maintain the splice bars in position under such a pressure that will automatically take up the wear between contacting surfaces and rigidly hold the abutting rail ends in the intended position.

A further object of the invention is to provide a plate of the kind which is so formed at its middle as to provide a transversely enlarged bulged contact portion about which the ends may flex in tightening up the bolts, which contact portion increases the strength of the plate at this point and also the springy action thereof during such tightening up said bolts.

Another object of the invention is to provide such a plate having flat ends, whereby the necessity of expensive dies as well as the number of operations to produce said plate is greatly reduced, with a corresponding reduction in cost of manufacture.

Still another object of the invention is to provide such a plate with bonding fingers so arranged that in the tightening of the splice bolts, said fingers will engage the abutting rail ends to provide an electrical bond between them for the circuit of the signal system, thus eliminating the necessity of the usual bonding wires.

These objects of the invention, as well as others together with the many advantages thereof will more fully appear as I proceed with my specification.

In the drawings:—

Fig. 1 is a view in plan elevation of a rail joint structure embodying my improved spring plate construction.

Fig. 2 is a view in side elevation of the same.

Fig. 3 is a transverse vertical section on an enlarged scale as taken on the line 3—3 of Fig. 2.

Fig. 4 is a view in side elevation on an enlarged scale, of the plate as when removed from the rail joint.

Fig. 5 is a longitudinal section through the plate as taken on the line 5—5 of Fig. 4.

Referring now in detail to that embodiment of the invention illustrated in the accompanying drawings: 1 and 2 indicate respectively the abutting ends of adjacent rail sections and 3 and 4 indicate respectively the inner and outer splice bars of the rail joint. The splice bars are secured to said rail ends by the usual wing bolts 5 and nuts 6 the bolts including oppositely disposed extensions on the shank adjacent the head. The bolts are staggered in position so that the heads of alternate bolts engage one splice bar and the heads of the other bolts engage the other splice bar.

My improved spring plate includes a concavo-convexed body or middle portion 7 and flat end portions 8—8, the extreme ends of which are curved rearwardly or inwardly to provide transverse stiffening ribs $8^a$ of a depth equalling the bulge on the rear side of the body portion. The body portion 7 is of a transverse width greater than the end portions so that there is formed in effect top and bottom body extensions 9 and 10 respectively which are made in continuations of the transverse curvature or bulge of said body portion, thus increasing the rigidity and strength thereof. As best shown in Figs. 4 and 5 said body portion approximates a spherical cross section.

In each flat end portion 8 on the median line of the plate and adjacent the body portion 7 is formed a bolt opening 11 and 12 respectively, one of said openings being slightly elongated to receive the wing portion of the connecting bolts 5.

In connection with my improved spring or joint plate I may incorporate therein a bonding means which so engage the rail ends as to electrically connect them together for signal circuit work. In the drawing I have illustrated such bonding means as forming an integral part of the top extension 9 of the body 7. As best shown in Figs. 1 to 4 inclusive, the top extension is elongated transversely and is then bent over to extend rearwardly to provide spaced bonding fingers 13 and 14, each terminating in a sharpened curved edge to bite into the outside surface of the head of the rail, when the nuts 6 are drawn home to tighten up the bolts. By providing the sharpened edges they will cut through scale and rust to insure a good electrical contact engagement with each rail section. Said bonding fingers are separated by a V-shaped recess or notch 15 and thus each readily adjusts itself to automatically compensate for any differences occurring in the heads of abutting rail ends.

In drawing up on the bolts, those parts of the end portions 8—8 adjacent the bolt openings are drawn in toward the outer joint plate 4, thus placing said end portions under a tension so that the joint plates are not only brought into the desired engagement with the proper rail surfaces, but are held therein with a pressure sufficient to resist any loosening tendencies. As the nuts are drawn home, they will of course, cause the sharpened edges of the bonding fingers to bite into the rail heads thus insuring proper electrical contact for signal circuits between the rail ends. Thus the bonding is performed at the time of applying a spring plate, which eliminates extra parts and expense of assembly.

My improved plate is simple in construction, positive in operation and may be readily made and installed in place. While in describing my invention, I have referred to many details of mechanical construction as well as form and arrangement of the parts thereof, I do not wish to be limited thereto except as may be pointed out in the appended claims.

I claim as my invention:

1. A rail joint member embodying therein, an elongated apertured plate having a body portion and flat end portions, said body portion being formed as a part of a sphere and of a transverse width greater than said end portions.

2. A rail joint member embodying therein, an elongated apertured plate having a body portion and flat end portions, said body portion being bulged inwardly and having top and bottom parts extending beyond the top and bottom edges of said end portions, the extreme ends of which are turned inwardly to terminate in the plane of said bulged body portion.

3. A rail joint member comprising an elongated apertured plate having a central body portion and end portions, said body portion being bulged inwardly and including parts to engage the heads of abutting rail ends for bonding purposes.

4. A rail joint member comprising an elongated apertured plate including a central body portion and flat end portions, said body portion being bulged inwardly and including spaced extensions adapted to have an edge contact with the heads of abutting rail ends for bonding purposes.

5. A rail joint member comprising an elongated apertured plate including a central body portion and flat end portions, said body portion being bulged inwardly and including spaced extensions having sharpened edges adapted to engage the heads of abutting rail ends for bonding purposes.

6. A plate of the kind described embodying a central body portion and apertured end portions, said body portion being formed as a part of a sphere and having top and bottom extensions with one of which are integral, spaced bonding fingers, the extreme ends of said end portions being curved inwardly.

7. In combination with abutting rail ends, splice bars one on each side of said rail ends and bolts passing therethrough, a spring plate engaged with one of said splice bars and through which two of said bolts extend, said plate including an inwardly bulged body portion having integral bonding fingers and end portions, the extreme ends of which are curved inwardly, said body portion and said extreme ends being engaged with said last mentioned splice bar.

In testimony whereof, I have hereunto set my hand, this 13th day of March, 1926.

ROBERT L. CAIRNCROSS.